(12) United States Patent
Forssell et al.

(10) Patent No.: US 7,839,871 B2
(45) Date of Patent: Nov. 23, 2010

(54) EVALUATING A COMMUNICATION INTERFACE

(75) Inventors: Mika Forssell, Soderkulla (FI); Pasi Sarolahti, Helsinki (FI)

(73) Assignee: Nokia Corporation, Espoo (FI)

( * ) Notice: Subject to any disclaimer, the term of this patent is extended or adjusted under 35 U.S.C. 154(b) by 770 days.

(21) Appl. No.: 11/617,836

(22) Filed: Dec. 29, 2006

(65) Prior Publication Data
US 2008/0056286 A1 Mar. 6, 2008

(30) Foreign Application Priority Data
Aug. 29, 2006 (GB) ................................. 0616992.4

(51) Int. Cl.
*H04L 12/28* (2006.01)
*H04L 12/56* (2006.01)
(52) U.S. Cl. ..................................................... 370/401
(58) Field of Classification Search .................. 370/401
See application file for complete search history.

(56) References Cited

U.S. PATENT DOCUMENTS

| | | | |
|---|---|---|---|
| 5,613,213 A | 3/1997 | Naddell et al. | |
| 2002/0087674 A1* | 7/2002 | Guilford et al. | 709/223 |
| 2003/0039234 A1* | 2/2003 | Sharma et al. | 370/338 |
| 2005/0003822 A1 | 1/2005 | Aholainen et al. | |
| 2005/0066033 A1 | 3/2005 | Cheston et al. | |
| 2005/0239497 A1* | 10/2005 | Bahl et al. | 455/552.1 |
| 2005/0266844 A1* | 12/2005 | Narasimha | 455/435.2 |
| 2006/0140150 A1* | 6/2006 | Olvera-Hernandez et al. | 370/331 |
| 2006/0203774 A1* | 9/2006 | Carrion-Rodrigo | 370/331 |
| 2007/0160072 A1* | 7/2007 | Thalanany et al. | 370/401 |
| 2007/0291792 A1* | 12/2007 | Watfa et al. | 370/469 |
| 2008/0101266 A1* | 5/2008 | Dahlstedt et al. | 370/310 |

FOREIGN PATENT DOCUMENTS

| | | |
|---|---|---|
| DE | 10354942 | 5/2005 |
| EP | 0781064 | 6/1997 |
| EP | 1589781 | 10/2005 |
| WO | WO0201807 | 1/2002 |
| WO | WO2004008693 | 1/2004 |

OTHER PUBLICATIONS

Sarfraz Khurshid et al., "Exploring the Design of an Intentional Naming Scheme with an Automatic Constraint Analyzer", Laboratory for Computer Science, Massachusetts Institute of Technology, 0-7695-0710-7/00, 2000 IEEE, pp. 13-22.

(Continued)

*Primary Examiner*—Daniel Wu
*Assistant Examiner*—Frederick Ott
(74) *Attorney, Agent, or Firm*—Locke Lord Bissell & Liddell LLP (57) ABSTRACT

The present invention relates to an apparatus configured for communication via a plurality of access interfaces. The apparatus comprises a processor configured to process information regarding access interfaces received from an access system. The processing is for determining the suitability of at least one access interface for communication with an application based on said information regarding access interfaces and information regarding the application.

33 Claims, 4 Drawing Sheets

OTHER PUBLICATIONS

William Adjie-Winoto et al., "The design and implementation of an intentional naming system", M.I.T. Laboratory for Computer Science, 17th ACM Symposium on Operating Systems Principles (SOSP '99), Published as Operating Systems Review, 34(5): pp. 186-201, Dec. 1999.

E. Guttman et al., "Service Templates and Service: Schemes", Sun Microsystems, Network Working Group, Standards Track, pp. 1-33, Jun. 1999.

International Search Report of PCT/IB2007/002389—Date of Completion of Search: Feb. 22, 2008.

* cited by examiner

EVALUATING A COMMUNICATION INTERFACE

FIELD OF THE INVENTION

The present invention relates to evaluating suitability of at least one communication interface for communication with a network based application.

BACKGROUND OF THE INVENTION

A user may communicate with a network based application such as a service application via a communication system. A communication system is a facility which enables communication between two or more entities such as user terminal devices or other communication devices, network entities and other nodes. The communication may comprise, for example, communication of voice, electronic mail (email), text messages, data, multimedia and so on. The communication can be related to use of various services provided by service applications. The applications are typically provided by means of application servers connected to a data network.

A user accesses a communication system via an access interface. An access interface is typically provided by an access system, for example an access network. An access system typically provides the access interface in accordance with a given standard or with a given set of specifications which set out what the various elements associated with the interface are permitted to do and how that should be achieved. For example, the standard or specification may define if the user, or more precisely user device, is provided with a circuit switched bearer or a packet switched communication, or both. Communication protocols and/or parameters which should be used for the connection are also typically defined. For example, the manner in which communication should be implemented between the user device and the elements of the access system is typically based on a predefined communication protocol. One or more gateway nodes may be provided for connecting an access network to other communication networks, for example to an IP (Internet Protocol) and/or other packet switched data networks, thereby enabling use of the resources, for example applications, provided by the data networks.

An access interface may be provided by a fixed line or wireless communication interface. Examples of fixed line access technologies include public switched telephone networks (PSTN), cable networks, local area networks (LAN), digital subscriber line (DSL) networks, asynchronous DSL (ADSL) networks and so on. Communication systems providing wireless access enable at least some degree of mobility for the users thereof. More advanced mobility support can typically be added as an enhanced feature. An example of systems providing wireless access interfaces is a public land mobile network (PLMN) or a cellular mobile system. Other examples of wireless access technologies include various wireless local area networks (WLANs) and satellite based systems.

A communication device may be configured to be capable of accessing a communications system by means of a plurality of different access interfaces. This requires that the communication device is compatible with different access technologies. For example, sophisticated mobile devices are provided with multi-radio capabilities and may therefore access services via a number of access technologies. For example, a mobile device may connect to services provided via the communications system by setting up a PDP context with a third generation (3G) access network, or by setting up a connection through a non-cellular complementary access system, for example a WLAN. According to other examples, a device can be configured to for both wireless access and fixed line access or for access via two different fixed connections.

This means that a user of a communication device is provided with the possibility to choose one of a plurality of access networks for communication with an application provided in the network. Because of the different nature of the access systems substantially different features such as networking protocols and applications may be used by the different access technologies. A result of this is that all access networks may not offer similar level of service and similar features. Thus it is not always possible to use every available access system for a particular network application, or an access system for all available applications. Thus a particular application may not be compatible with all of the available access systems, and therefore a selection of an appropriate access system may be required.

Selecting an access system for the communication media is a blind procedure. Typically, when an application starts communication over the connection, it uses a preconfigured network interface without any additional information that might be needed in providing the application required connectivity. The application may only request the end user to select an appropriate access network or to configure the selected access network in an appropriate manner. A user of a communication device can then decide which network or access method shall be used for each application, and configure the device accordingly, typically via a menu selection.

As the number of available applications and access systems increases, this can lead to an unfavourable user experience as trial and error may have to be used to discover, which access methods support which services. Automation of the access network selection would, however, be desirable to enhance usability of the devices and applications.

Also, as the end user or client is expected to select manually an access network for providing the communication medium for a connection between the end user and the application, the end user is also expected to solve any problems that may occur.

Some of the applications available are local in the sense that they may be associated with a specific access network. For example, downloading of ring tones, some other downloading applications and accessing of an email server may work only when using a cellular data connection via a cellular network of a given operator. This may hinder use of other services and even the mobility of the user. For example, when such services are used a mobile communication device cannot perform handoffs between different access interfaces.

If a wrong access network is selected, or the network is wrongly configured, the data packets may be silently lost in the network without them ever reaching the destination. It may take several minutes for a Transport Control Protocol (TCP) connection to time out in the lack of response from the other end, because a TCP sender cannot know whether packet losses are caused by a transient network problem, by a permanent condition in the network structure or for some other reason.

A similar problem may occur during a handoff of a mobile device. A mobile device does not necessarily know whether a new access network supports the same routing and service characteristics than the old access network, and more particularly, if characteristics and features required by the application are supported. Therefore, selection of a wrong access network may cause the connection to the application to be dropped. This may, however, be realized only after a time out period, possibly only after several minutes.

In accordance with an attempt to solve this problem a communication device may be configured to have a destination network identity (ID) list for each access interface. The list defines appropriate access interfaces for a given service. However, use of destination network IDs is not an application level concept. Instead, the lists have to be configured by the user or provisioned otherwise individually into each communication device. This can be troublesome and preventive of a wide spread use of the destination network IDs.

SUMMARY OF THE INVENTION

The embodiments of the invention may provide various advantages, including, but not limited to enhanced mobile device usability and efficient utilization of available access technologies. The embodiments may provide an efficient tool for a communication device to automatically select an appropriate access technology.

In accordance with an embodiment there is provided an apparatus configured for communication via a plurality of access interfaces. The apparatus comprises a processor configured to process information regarding access interfaces received from an access system to determine suitability of at least one access interface for communication with an application based on said information regarding access interfaces and information regarding the application.

In accordance with another embodiment there is provided a communication system comprising a plurality of access interfaces for providing a communication device with access to the communication system. The system also comprises an apparatus for providing at least one application and a controller entity configured to provide the communication device with information regarding at least one access interface. The communication device is configured to determine suitability of the at least one access interface for communication with an application provided by the apparatus based on the information regarding the at least one access interface and information regarding the application.

In accordance wit ha yet further embodiment there is provide a method for selecting an access interface. The method comprises providing a communication device with information regarding an application, providing the communication device with information regarding at least one access interface, and determining at the communication device the suitability of the at least one access interface for communication with the application based on the information.

In accordance with a more specific embodiment the apparatus is configured to select an access interface based on the determination and to inform a controller of the apparatus of the selection. The controller may be configured to control a connection set-up procedure to the application via the selected access interface in response to the information.

The determination of the suitability of the at least one access interface may be based on a service identification. The service identification may comprise a domain name service name.

At least a part of an address associated with the application may be compared with information regarding an address associated with an access interface. An access interface with an associated suffix that matches with a suffix that associates with the application may be determined as being suitable.

At least a part of the information may be obtained from an unsolicited announcement.

A determination may be provided if a particular application or another similar application is already used via an access interface. In response to a positive determination, directions may be given to use a similar interface for the particular application.

The apparatus may be comprised in a communication device or in a network device. The communication device may comprise a mobile communication device.

For a better understanding of the present invention and how the same may be carried into effect, reference will now be made by way of example only to the accompanying drawings in which:

DETAILED DESCRIPTION OF THE DRAWINGS

Before explaining in detail certain exemplifying embodiments, an exemplifying communication system and some general principles of accessing a communication system are briefly explained.

A communication device can be used for accessing a communications system via an access interface. An access interface is typically provided by an appropriate access system. For example, in systems providing mobility for the users thereof a mobile communication device can access the communication system via a wireless interface. The wireless interface is typically provided between the mobile device and at least one base station or similar wireless transmitter and/or receiver apparatus connected to the communication system. A base station is typically controlled by at least one appropriate controller, for example a base station controller and/or a radio access network controller or the like. A mobile device may communicate with the controller of the access system via radio channels which are typically referred to as radio bearers. Each mobile device may have one or more radio channels open at the same time.

A mobile device may be used for accessing various service applications or other applications via an appropriate communication interface. For example, an application running in a mobile device may access a service application via a packet switched communication medium based on appropriate protocols, for example an appropriate wireless communications protocol and/or the internet protocol (IP).

Figure 1:
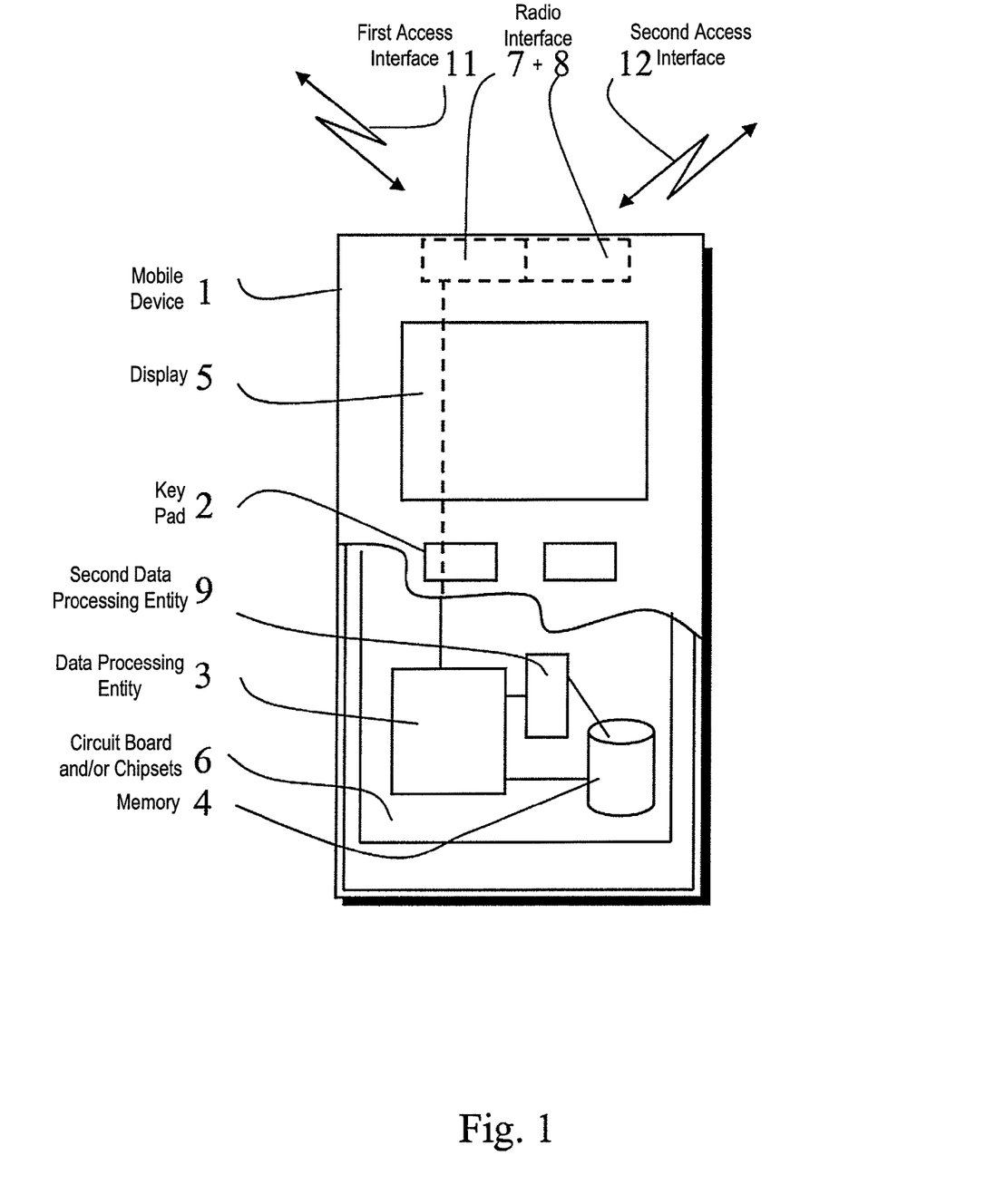
FIG. 1 shows a partially sectioned view of a communication device.

FIG. 1 shows a schematic partially sectioned view of a communication device in accordance with an embodiment. More particularly, FIG. 1 shows a mobile communication device 1 that can be used for accessing a communication system via at least one wireless interface. A mobile device may be provided by any appropriate device capable of at least sending or receiving radio signals. Non-limiting examples include a mobile station (MS), a portable computer provided with a wireless interface card or at least one other wireless interface facility, personal data assistant (PDA) provided with wireless communication capabilities, or any combinations of these or the like.

The mobile device 1 may communicate via an appropriate radio interface arrangement of the mobile device. In FIG. 1 the radio interface arrangement is designated schematically by blocks 7 and 8. The interface arrangement may be provided e.g. by means of a radio part and associated antenna arrangement. The antenna arrangement may be arranged internally or externally to the mobile device.

The mobile device 1 of FIG. 1 can be used for various tasks such as making and receiving phone calls, for receiving and sending data from and to a network and for experiencing, for example, multimedia or other content. A mobile device is typically provided with at least one data processing entity 3 and at least one memory 4 for performing the tasks it is designed to perform. The data processing and storage entities can be provided on an appropriate circuit board and/or in chipsets. This feature is denoted by reference 6.

The user may control the operation of the mobile communication device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Figure 3:
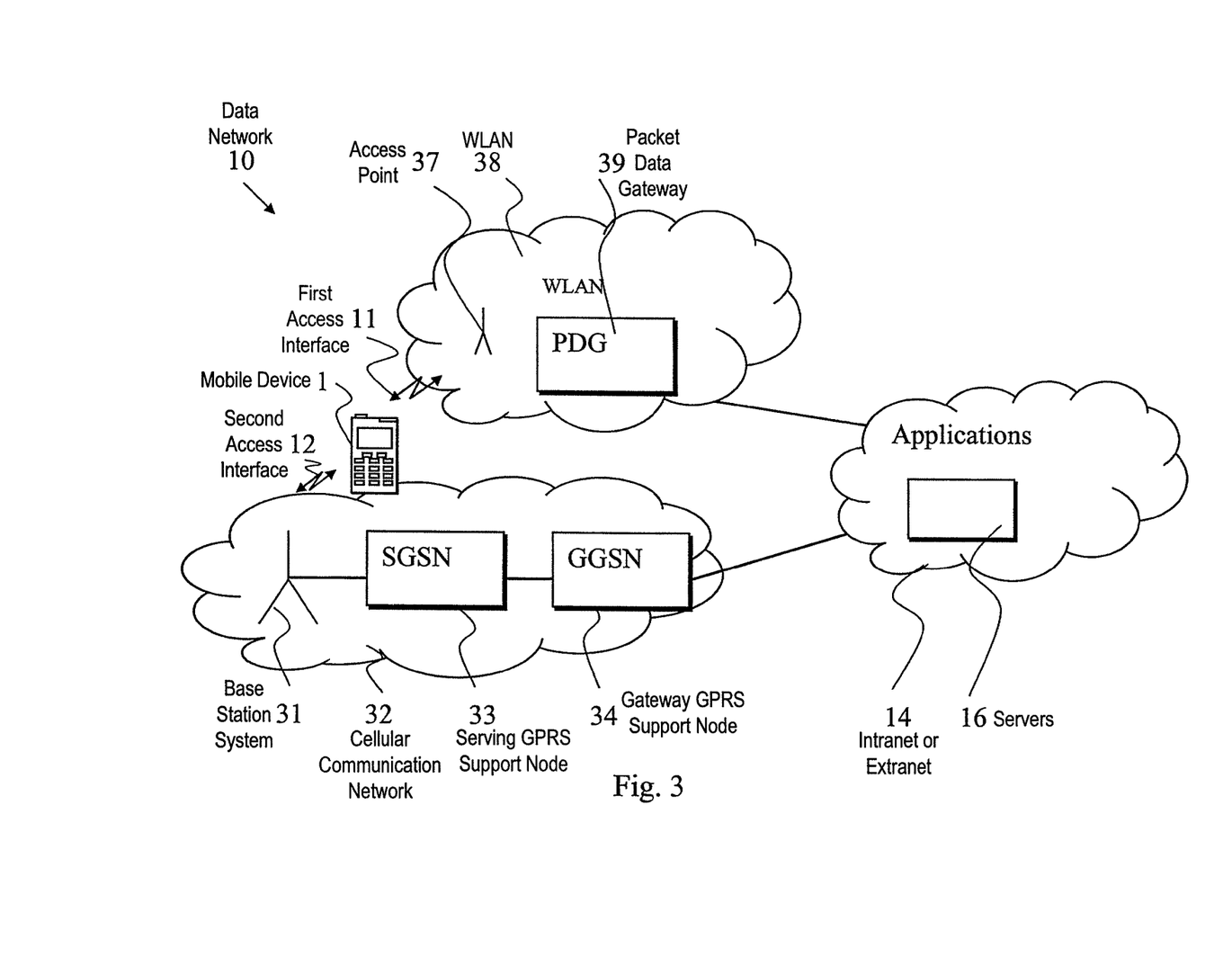
FIG. 3 shows a communication system providing a multiple of access networks for a mobile device.
Figure 4:
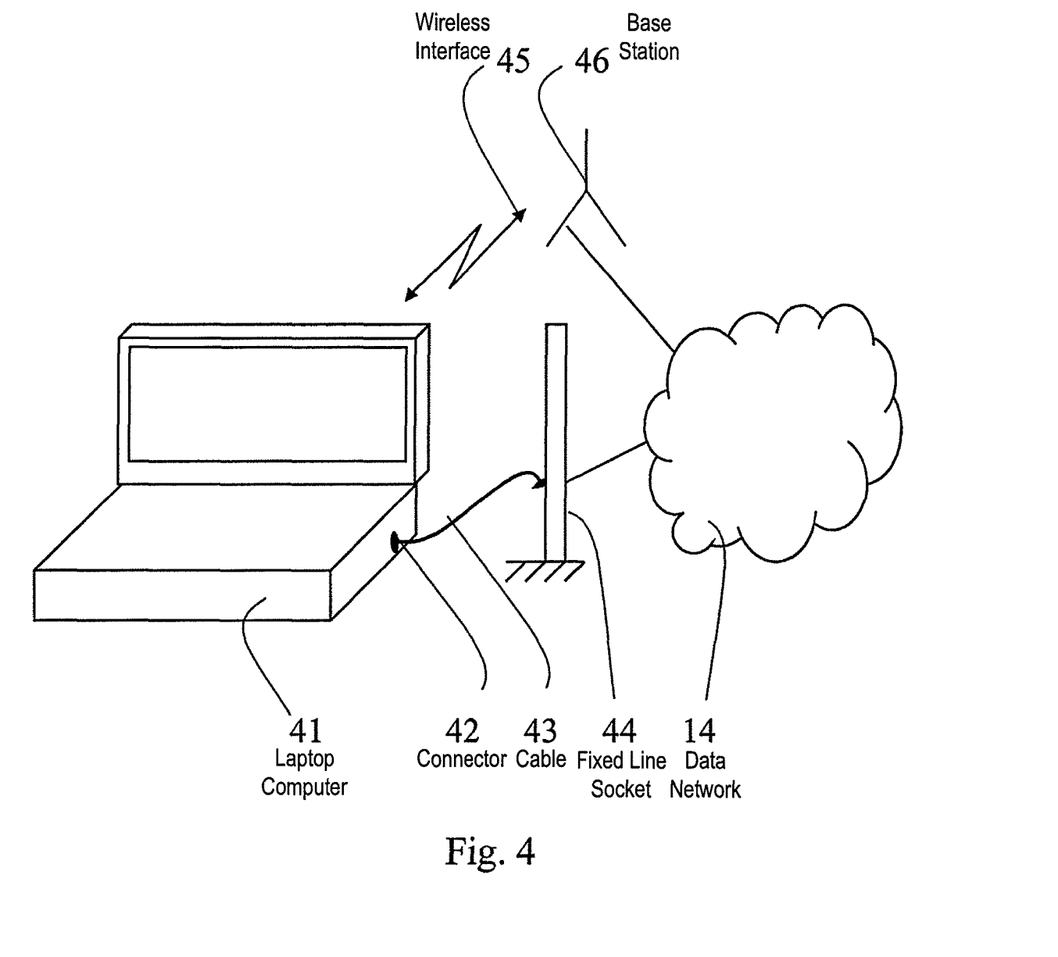
FIG. 4 shows a communication device in accordance with another embodiment.

The mobile device 1 is enabled to communicate via at least two different access interfaces 11 and 12. The different access interfaces 11 and 12 can be based on different access technologies. The difference access technologies may comprise, for example, two different wireless interfaces as shown in FIGS. 1 and 3, a wireless and a fixed interface as shown in FIG. 4 or even two different fixed interfaces. The mobile device 1 may be configured to enable access via a multiple of wireless interfaces based on, for example, an appropriate multi-radio implementation. The different radio parts of this example for providing the multi-radio implementation are denoted by references 7 and 8, respectively. It is noted that instead of separate radio parts a single radio part may be employed for communication via different wireless interfaces. The radio parts 7 and 8 are connected to the processor 3 for control thereof.

The mobile device 1 can be handed over from an access network to another, and even from an access technology to another. Typically the handover process is controlled by at least one controller or a set of interconnected controllers. The handover controller may be provided by any appropriate controller entity for managing and/or initiating a handover or similar transfer of the mobile device. The controller is suitably interconnected with the access systems so as to appropriately control the handover.

FIG. 1 shows a second data processing entity 9 adapted for performing required data processing in accordance with certain embodiments. More particularly, data processing entity 9 of the mobile device 1 is configured to determine how communications with a particular another party should be routed. The processor entity 9 of the mobile device may be used for determining, for example, if communications shall be routed via an interface provided by a cellular mobile network, an interface provided by wireless local area network or an interface provided by a cable. Determination of the suitability of an interface may be required, for example, during connection start-up or when making roaming decisions between available access networks. The herein described arrangement enables the mobile device 1 to make an informed selection of a suitable access system and/or a communication interface.

More particularly, the processor entity 9 may be provided to process information regarding available access interfaces and external applications to select a suitable communication interface for a particular service. The information may be provided by the access systems and the external applications in various manners. In FIG. 1 the controller 9 may provide a mobile device connection management entity that is able to automatically select or at least suggest to an end user which access network is able to provide required connectivity for an application. The processor entity may inform the controller 3 of its findings, where after the controller 3 may control the operation of the radio parts 7 and 8 accordingly.

An access system may be configured to provide the mobile device with at least a part of the information required by the mobile device in determining and/or selecting a suitable communication interface. This information may be provided, for example, by a local gateway node that provides the first router of data packet. In WLAN systems this router may be integrated with a WLAN access point. In the GPRS the information may be provided, for example, by a GPRS gateway node. The gateway node may provide the information either itself or with assistance of elements of other networks the GPRS gateway is connected to. It is noted that these elements are given only as non-limiting examples, and that the information may be provided from any appropriate source. In certain application it may be advantageous to keep the information used by the mobile device in determining and/or selecting a suitable communication interface clearly separated from other information, for example service discovery information and messages to avoid confusion.

In accordance with an embodiment an access network is configured to send a message containing service network information such as an explicit service network identification after the access network becomes reachable to the mobile device. The mobile device can proceed to use the access network if the service network information provided is found to match with a network service that is acceptable for the application about to be used.

A communication system may be configured to provide isolated network segments dedicated to some specific services. For example, certain segments may provide operator services, other segments a company intranet and so forth. The service network information may also be used in identifying an appropriate network segment.

According to a possibility it is checked if the service is already used via some other network interface, and if so, the mobile device is directed to use a similar interface also for the requested service.

If it is found that the service network information is not compatible with the network service requested by the application, the mobile device may then select another network. If no suitable networks are available, different actions may follow. For example, the mobile device may report an error condition to the user, for example by displaying an appropriate message and/or by a sound alarm.

Figure 2:
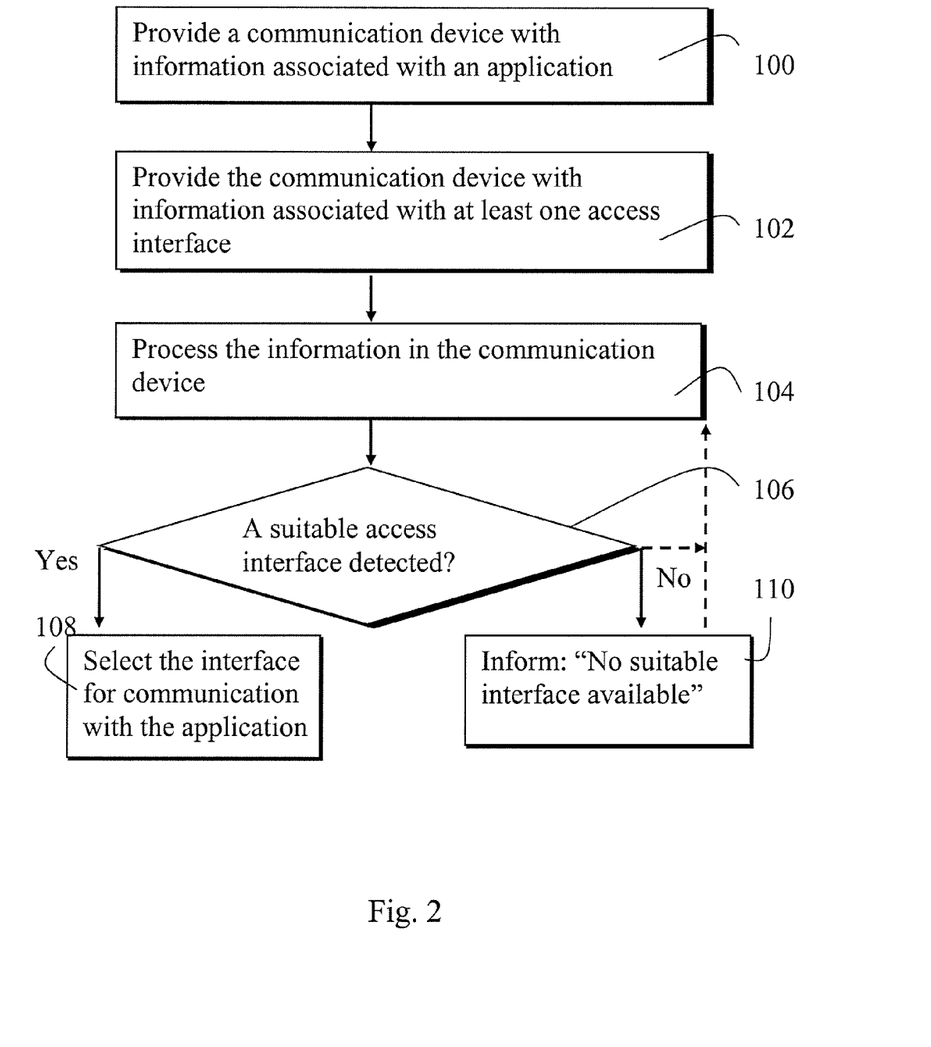
FIG. 2 is a flowchart in accordance with an embodiment.

FIG. 2 shows a flowchart in accordance with an embodiment for selection of a suitable interface for a communication device. The communication device is provided at 100 with information regarding a network application. The information may comprise, for example, information regarding requirements and/or restrictions the application may have set for the communication medium and/or of the type of the service network. A communication device is also provided with information regarding at least one access interface at step 102. At least a part of the information may be provided beforehand, periodically or when a communication device registers with an access system. A communication device may also send a query to an application regarding possible requirements for the connection and/or to the access system regarding the features of the available access interface(s).

In accordance with a particular embodiment the desired application or the user provides an identification of a desired service network at 102. The service network identification may be provided, for example, as a part of the DNS name of the service application. Each available network access interface may then provide the communication device with information identifying the service network they are associated with. For example, relevant access networks may provide the current service network identification they are connected to. This information may comprise, for example, the DNS suffix of the local service network, a transport protocol port number, a logical service identification such as P2P (peer to peer) and so forth.

The information regarding at least one access interface and the application is then processed by a mobile device at 104. The processing is to determine if at least one of the available access interfaces can be used for communication with the application. At least one appropriate access interface may then be found at 106.

If several suitable network interfaces are found, it can be determined which one of these would be the best suited for the task. The selection may be based, for example, on simple priority scheme or heuristics based on available information about factors such as bandwidth, price, time of the day, location and so on.

An appropriate interface may then be selected at 108 for communication with the application.

If it is determined that no suitable access interface is available the user may be informed accordingly at 110. The mobile device may then be triggered to monitor if a suitable access interface becomes available. Effectively this means return to stage 104 where available information is processed, as shown by the dashed arrows. Any other appropriate procedure may also follow. For example, the application may be put in a hold, i.e. state where it is waiting for a suitable interface to become available. The application may then react and start itself properly in response to detection of a suitable interface at 104. The mobile device might also try to use available but assumingly unsuitable networks. Virtual network interfaces may also be tried. These include virtual private network (VPN) connections based on IP tunneling that can utilize a native Internet connection to reach a limited service network, for example an intranet.

In an embodiment an appropriate configuration control protocol is used for providing at least some information regarding the available access interfaces to a mobile device. An example of an appropriate protocol is the Dynamic Host Configuration Protocol (DHCP). The DHCP is a protocol that is typically used for automating configuration of computing devices that are adapted to operate in accordance with the Transport Control Protocol/Internet Protocol (TCP/IP).

The information for identifying the access interface and/or the application may be based on various mechanisms. A possible mechanism is based on use of the domain name service (DNS) names. DNS names are commonly used in the DHCP to indicate the local network domain being connected to. A parameter of the DHCP is the domain name service (DNS) suffix of a local network. The DNS suffix is typically provided by an operator of the local network. Services that are available in a local network may be assigned a DNS name that includes the DNS suffix of a service provided by the local access network. The mobile device can then prefer to select an access network that has the matching DNS suffix with the application server host that is being accessed.

The processor 9 may provide a specific DNS resolver module for determining the suitability of an access network based on information about the DNS names and suffixes. Alternatively, this module may be included in the main processor 3 of the mobile device.

In certain embodiments the resolver module may be configured to operate such that it sends a DNS query to an interface that is identified based on the local DNS suffix. The resolver module may then assign a network identifier to provide a resulting address. The resulting address may be provided by a combination of an IP address and an IP zone identifier.

A reference will now be made to FIG. 3 showing a particular example of how a mobile communication device 1 may use various applications provided in a data network 10. The applications are typically provided by means of servers 16 connected to the data network. It is noted that although only one application server is shown for simplicity, a plurality of application servers may be provided. The applications may be provided in the data network based on any appropriate protocol. The applications may be provided, for example, by means of the Internet Protocol (IP), and thus the cloud 14 can be understood as, for example, denoting the Internet or an intranet.

FIG. 3 shows certain elements of two different exemplifying wireless access system, namely a General Packet Radio Service (GPRS) network and a wireless local area network (WLAN) 38, for example a hotspot WLAN. Each of the access systems is capable of providing an access interface to services of an operator.

More particularly, the cellular communication network 32 provides packet switched data transmission facility between a support node 33 and a mobile device 30. The network 32 is connected to at least one external data network, for example the data network 14, via a gateway GPRS support node (GGSN) 34. Thus the GPRS service allows transmission of packet data between mobile devices and external data networks.

In addition to at least one gateway, a network may comprise also at least one packet data service node (SN). In the shown embodiment, a service node is provided by a serving GPRS support nodes (SGSN) 33. Each of nodes 33 is connected to at least one mobile radio access network, typically to a base station system 31. The base station system 31 is arranged to transmit signals to and receive signals from the mobile device 1 via a wireless interface 12. Correspondingly, the mobile device 1 is able to transmit signals to and receive signals from the base station system via the wireless interface.

Communication between user equipment and the GGSN can be provided by a PDP (packet data protocol) context. Once a PDP context is established, it can typically carry multiple flows having similar enough data transfer characteristics. Each flow normally represents, for example, a particular service and/or media component of a particular service. A mobile device may have one or more active PDP contexts at a time.

In addition to interface(s) provided by the network 32, the mobile device 1 may access the data network 14 via the wireless local area network (WLAN) 38. WLAN is an example of local access technologies that provide radio access to another system, for example an IP network, another device and so forth. It is noted that no IP based communications is necessarily required but some other protocol may be used instead. Each WLAN is provided with at least one access point 37 and a packet data gateway 39. The packet data gateway 39 may be used to connect the WLAN to the data network 14.

The data carrying interface can be provided by means of a number of protocols. For example, when accessing an IP network and services provided in the IP network, the IP protocol is used to carry data, UpnP (Universal plug and play) may be used to discover devices and services, and so on. IP security may be enhanced by using a so called IPsec (Internet Protocol Security) tunnel.

Turning now to an embodiment wherein an appropriate access interface is selected from the two possible interfaces 11 and 12 of FIG. 3. The mobile device 1 may have been provided by the WLAN network 38 a DNS suffix, for example "hotspot.com". At the same time, the mobile device 1 may be provided by the GPRS network 32 another suffix, for example "services.operator.com". The WLAN network 38 may be set as the preferred or default option, for example due to the higher bandwidth and lower data transfer cost provided by the wireless interface 11. When a user wants to visit a web page, for example "www.lookatme.com", the mobile device can then select the WLAN network 38 for wireless communication because it is detected that the name "www.lookatme.com" does not satisfy a predefined matching criteria with either of the suffixes "hotspot.com" or "services.operator.com".

However, if the user browses a web page from address "ringtones.services.operator.com", the mobile device 1 may select the GPRS access network 32 instead of the default interface for providing the wireless access interface 12 because of the matching "services.operator.com" part.

The mobile device 1 may even be prevented from roaming to any other access network if said other network does not provide a compatible suffix.

Use of DNS suffixes is a relatively easy option to deploy since the DNS names are in relatively wide use. It is noted, though, that other means for identification can also be used for identifying an access network. For example, literal names may be defined for the service networks. This can be provided as an extension in the DHCP protocol or any other configuration protocol. The arrangement may be such that all local services share a common suffix part of a DNS name, for example the above mentioned "services.operator.com". To avoid confusion and naming conflict, a scheme for distinguishing the local DNS suffixes or other suffixes provided in association with access interfaces in isolated networks from those used in the Internet may be provided.

In certain standards a communication device may need to complete certain specific procedures in order to be able to receive and process messages of a configuration control protocol. For example, to be able to receive and process a DHCP notification a communication device may need to establish a layer 2 attachment procedure to the access network. To avoid need for this a communication device can store in a memory thereof any parameters it might need later on from the first query when it receives these. Also, a configuration control protocol message can be sent in advance so as to ensure the communication device has necessary information available in its memory should there be a need for it.

The specific examples of embodiments are described above mainly in the context of wireless interfaces and mobile communication devices. Similar principles, however, may also be applied to other types of communication devices, such as communication devices that are configured to use at least one fixed access interface.

This is illustrated in FIG. 4 showing a communication device provided by a laptop computer 41. The laptop computer may communicate via a cable 43 connected to one of its connectors 42, for example a universal serial bus (USB) port from one end thereof and to a fixed line socket 44 from the other end. The fixed line connection may be based on, for example, a asynchronous digital subscriber line (ADSL), an Ethernet or a dial-up connection. The fixed line network then provides a connection to a data network 14.

The laptop computer 41 may also communicate via a wireless interface 45 with a base station 46. The base station may also be connected to the data network, although this is not always necessary. To provide the wireless connection, a laptop or desktop computer may be connected to or provided with a mobile device for wireless connection to a cellular system or to a local wireless network. The mobile device may be provided by means of a mobile module that can be inserted into a slot in the computer, or the wireless module can be an integrated part of the computer.

According to a possibility a handheld mobile communication device is configured such that it enables use of wired connections in addition to wireless connections. For example, a mobile phone or other mobile device may be configured to provide "IP passthrough" and to use an USB cable attached to a computer to facilitate communication via the computer and its connections instead of the wireless interface(s) provided by the mobile communication device.

A communication device may then use e.g. a cellular system for speech services but a fixed interface for Internet services. For example, a computer may use a mobile device as a modem, for example via an USB cable. The computer may determine, based on the service and access interface information, which services are available via given access interface and/or which interface should be used for a particular service.

In accordance with a further example, a desktop or a laptop computer may select an appropriate interface amongst a plurality of fixed interfaces. For example, the computer may be provided with one fixed network connection to a company intranet and another fixed network connection for connection directly to the public Internet. The computer may be provided with two network cards to facilitate access via two difference interfaces.

The above examples referred to a configuration control protocol such as the DHCP. It is noted, however, that a service network identification or other information that may be used in selection of an access interface, may be provided by other means than based on a configuration control protocol. For example, information regarding the access interfaces and/or the applications may be sent based on a notification mechanism construed in accordance with Institute Electrical and Electronics Engineers standard IEEE 802.21. Also multiple DNS suffixes may be used to indicate different service domains located in a single network segment.

According to a possibility the communication devices are provided with information for selection of appropriate access interfaces by means of unsolicited announcements. Unsolicited announcements are used, for example, for delivery of IP version 6 (IPv6) router advertisements or announcements in Internet Control Message Protocol (ICMP) or DNS protocol. An appropriate information element can be added to the announcement message for delivering network service identification information, either for direct processing in a processor or for storage in a memory of the communication device.

History information may also be utilized in selection of an appropriate interface for the communication medium. For example, a communication device connection management entity may keep a record of any received DNS suffixes, or other network service identification information, when initiating communication via an access interface. The stored information may be used later on to determine which access interface to use for communications with a particular application, or an application of a particular type. History information may be used even if the access interface to be selected is not active at the time when an application establishes connectivity. The connection management entity can be enabled to activate a correct access interface based on history information.

A communication device may be configured to send a query to a application regarding possible requirements for the connection. For example, the communication device may query for the type of the service. The communication device may then need to wait for a response containing e.g. service parameters before determining a suitable access interface for setting up a communication medium to the application. The communication device may send the query based on the service location protocol (SLP). An appropriate element in the network side may then reply with service parameters the terminal can use.

In accordance with an embodiment, the communication device may activate accesses sequentially to discover which one, if any, supports the desired application. However, this may cause delays, particularly during initial discovery round. This can be addressed by sending from the access system information wherein the available services are filtered, for example based on use statistics. The list may include only the most frequently deployed services. This information can be in the form of a simple list of such services. The communication device may then store this information. It is possible to provide a list of services in relation to an access system when the communication device registers itself with the access system. If a service is not located in any of these lists, another method, for example a SLP based query, can be used to determine the available from a plurality of access methods. The access network may also provide information such as transport protocol port numbers, logical service names and so on it supports (or does not support). The communication device may then use this information to identify whether a service application or another application can be routed/provided via the access network or not.

According to an embodiment a service network information regarding a first network may be provided via a second network. In a specific case a mobile communication device may inform a host node via a first network that it is considering a second network as the next target network. The mobile device may then receive service network information regarding the second network via the first network. This information can be used to avoid entering into the second network if it is detected that it does not support the required application.

Also, instead of processing the information at a communication device, the information may be provided to and processed in another entity. This may be employed, for example, in applications employing an interworking protocol between a cellular network and a local network, for example a Wi-fi (wireless fidelity) network. When an application is started, a communication device may send a query to a network device with an identification of the application. The query may be sent using appropriate messaging, for example IEEE 802.21 messaging, after the application start-up or in case an appropriate route cannot be found. Based on the identification and information in its database or otherwise available to it, the network device commands the communication device to use a specific access interface for the application. The network device is provided with information regarding the connectivity requirements of the application, for example how to provide a connection without firewalls or other nodes possibly blocking or delaying the traffic, and can thus be advantageously used in providing appropriate communication medium between communication devices and applications.

The required data processing functions may be provided by means of one or more data processors. Thus the above described data processing functions of a communication device may be provided by separate processors, see for example entities 3 and 9 of FIG. 1, or by an integrated processor. For example, all data processing may be provided in a central processing unit of a communication device, or distributed across several data processing modules.

An appropriately adapted computer program code product or products may be used for implementing the embodiments, when loaded on an appropriate processor, for example in a processor of the communication device and/or a network controller. The program code means may, for example, perform the determination of suitability of an interface, selection, generation of messages and/or information elements, interpretation of information and so forth. The program code product for providing the operation may be stored on and provided by means of a carrier medium such as a carrier disc, card or tape. A possibility is to download the program code product to the communication device via a data network.

The above embodiments may assist end users and/or communication devices to select an access interface that provides a communication media that satisfies the requirements of a particular application. The embodiments may reduce the risk of failed or inappropriate connections. The embodiments may work particularly well in multi-radio environments where polling all of the available access systems might be too time-consuming.

It is also noted that although certain embodiments were described above by way of example with reference to the exemplifying architectures of certain cellular communication networks, wireless local area network systems, and fixed line systems, embodiments may be applied to any other suitable forms of communication systems than those illustrated and described herein. It is also noted that the term access interface is understood to refer to any interface that an apparatus may use for accessing a communications system. For example, the available interfaces may be based on access systems such as those used by any cellular systems, or any local access systems such as the WLAN, UWB (Ultra Wide Band), or short range links such as the Bluetooth™ (a short range radio link), WiMax (Worldwide Interoperability for Microwave Access), or the Rfid (radio frequency identification), an infrared link, any cable based connection and so forth.

It is also noted herein that while the above describes exemplifying embodiments of the invention, there are several variations and modifications which may be made to the disclosed solution without departing from the scope of the present invention as defined in the appended claims.

The invention claimed is:

1. An apparatus configured for communication with a plurality of access systems via a plurality of corresponding access interfaces, the apparatus comprising: at least one processor; and at least one memory including computer program code, the at least one memory and the computer program code configured to, with the at least one processor, cause the apparatus to process information regarding at least one of a first access system or an interface corresponding to the first access system to determine suitability of the at least one first access system or the interface corresponding to the first access system, for communication with an application based on said information and information regarding the application, wherein said information regarding the at least one first access system or the interface corresponding to the first access system is received from a second access system.

2. The apparatus as claimed in claim 1, wherein the at least one processor is configured to select the at least one first access system or the interface corresponding to the first access system based on the determination and to inform a controller of the apparatus of the selection.

3. The apparatus as claimed in claim 2, wherein the controller is configured to control a connection set-up procedure to the application via the selected first access system or the interface corresponding to the first access system in response to instructions from the at least one processor.

4. The apparatus as claimed in claim 1, wherein the at least one processor is configured to determine the suitability of the at least one first access system or the interface corresponding to the first access system based on a service identification.

5. The apparatus as claimed in claim 4, wherein the service identification comprises a domain name service name.

6. The apparatus as claimed in claim 1, wherein the at least one processor is configured to compare at least a part of an address associated with the application with information regarding an address associated with an access system or an interface corresponding to the access system.

7. The apparatus as claimed in claim 6, wherein the at least one processor is configured to select an access system or an interface corresponding to the access system with an associated suffix that matches with a suffix that associates with the application.

8. The apparatus as claimed in claim 1, wherein the at least one processor is configured to obtain at least a part of the information from a configuration control protocol message received from the access system.

9. The apparatus as claimed in claim 8, wherein the configuration control protocol message comprises a Dynamic Host Configuration Protocol message.

10. The apparatus as claimed in claim 1, wherein the at least one processor is configured to obtain at least a part of the information from an unsolicited announcement received from the access system.

11. The apparatus as claimed in claim 1, comprising a domain name service resolver module for determining the suitability of an access system or an interface corresponding to the access system based on information including domain name service names and suffixes.

12. The apparatus as claimed in claim 11, wherein the resolver module is configured to send a query for an address to an interface that is identified based on a local domain name service suffix and to assign a network identifier to an address received in response to the query.

13. The apparatus as claimed in claim 1, wherein the at least one processor is configured to determine the suitability of an access system or an interface corresponding to the access system for at least one of a connection start-up and a roaming decision.

14. The apparatus as claimed in claim 1, wherein the at least one processor is configured to determine if the application or another similar application is already used via an access interface, and in response to positive determination to give directions to use a similar interface for the application.

15. The apparatus as claimed in claim 1, wherein the apparatus is allowed only use access systems or interfaces corresponding to the access systems allowed by the at least one processor.

16. The apparatus as claimed in claim 1, comprising a memory for storing at least one of information regarding the at least one first access system, information regarding the interface corresponding to the first access system, or the application.

17. The apparatus as claimed in claim 1, wherein the at least one processor is configured to query for said information.

18. The apparatus as claimed in claim 1, wherein the at least one processor is configured to base the determination at least partially on history information.

19. The apparatus as claimed in claim 18, wherein the apparatus is configured to maintain a record of network service identification information.

20. The apparatus as claimed in claim 18, wherein the apparatus is configured to store a list of available services.

21. The apparatus as claimed in claim 20, wherein the list identifies applications which are most frequently deployed.

22. The apparatus as claimed in claim 1, wherein at least one of the access interfaces is provided by an access system that is based on use of any one of a general packet radio service, a code division multiple access, a wideband code division multiple access, a GSM network, an EDGE network, an Ultra Wide Band, a short range link, a wireless local area network and a fixed network.

23. The apparatus as claimed in claim 1, wherein the apparatus comprises a communication device.

24. The apparatus as claimed in claim 23, wherein the communication device is a mobile communication device.

25. A communication system, comprising:
a plurality of access interfaces for providing a communication device with access to a plurality of corresponding access systems;
an apparatus for providing at least one application;
a controller entity configured to provide the communication device with information regarding at least one of a first access system or an interface corresponding to the first access system, wherein the communication device is configured to determine suitability of the at least one first access system or the interface corresponding to the first access system for communication with an application provided by the apparatus based on the information regarding the at least one access system or the interface corresponding to the first access system, and information regarding the application wherein said information regarding the at least one first access system or the interface corresponding to the first access system is received from a second access system.

26. The communication system as claimed in claim 25, wherein the at least one access interface is provided by an access system that is based on use of any one of a general packet radio service, a code division multiple access, a wideband code division multiple access, a GSM network, an EDGE network, an Ultra Wide Band, a short range link, a wireless local area network, and a fixed line connection.

27. A method, comprising:
providing a communication device with information regarding an application;
providing the communication device with information regarding at least one of a first access system or an interface corresponding to the first access system; and
determining at the communication device the suitability of the at least one first access system or the interface corresponding to the first access system for communication with the application based on the information, wherein said information regarding the at least one first access system or its interface is received from a second access system.

28. The method as claimed in claim 27, comprising receiving a service network identification.

29. The method as claimed in claim 27, comprising sending from the communication device a request for the information.

30. The method as claimed in claim 27, comprising selecting an interface based on the determination and setting up a communication medium between the communication device and the application via the selected interface.

31. The method as claimed in claim 27, wherein the determining comprises processing the information at a mobile communication device.

32. The method as claimed in claim 30, comprising transferring a mobile communication device from a first access network to a second access network in response to selection of the first access system or the interface corresponding to the first access system.

33. A computer program product comprising computer executable program code stored on a non-transitory computer readable storage medium, the computer executable program code being adapted to cause an apparatus to perform the method of claim 27 when the program code is executed by a processor.

* * * * *